March 24, 1931.  G. F. MacKENZIE  1,797,665
RECORDER
Filed March 5, 1929  2 Sheets-Sheet 1

Inventor
George F. MacKenzie

By *Clarence A. O'Brien*
Attorney

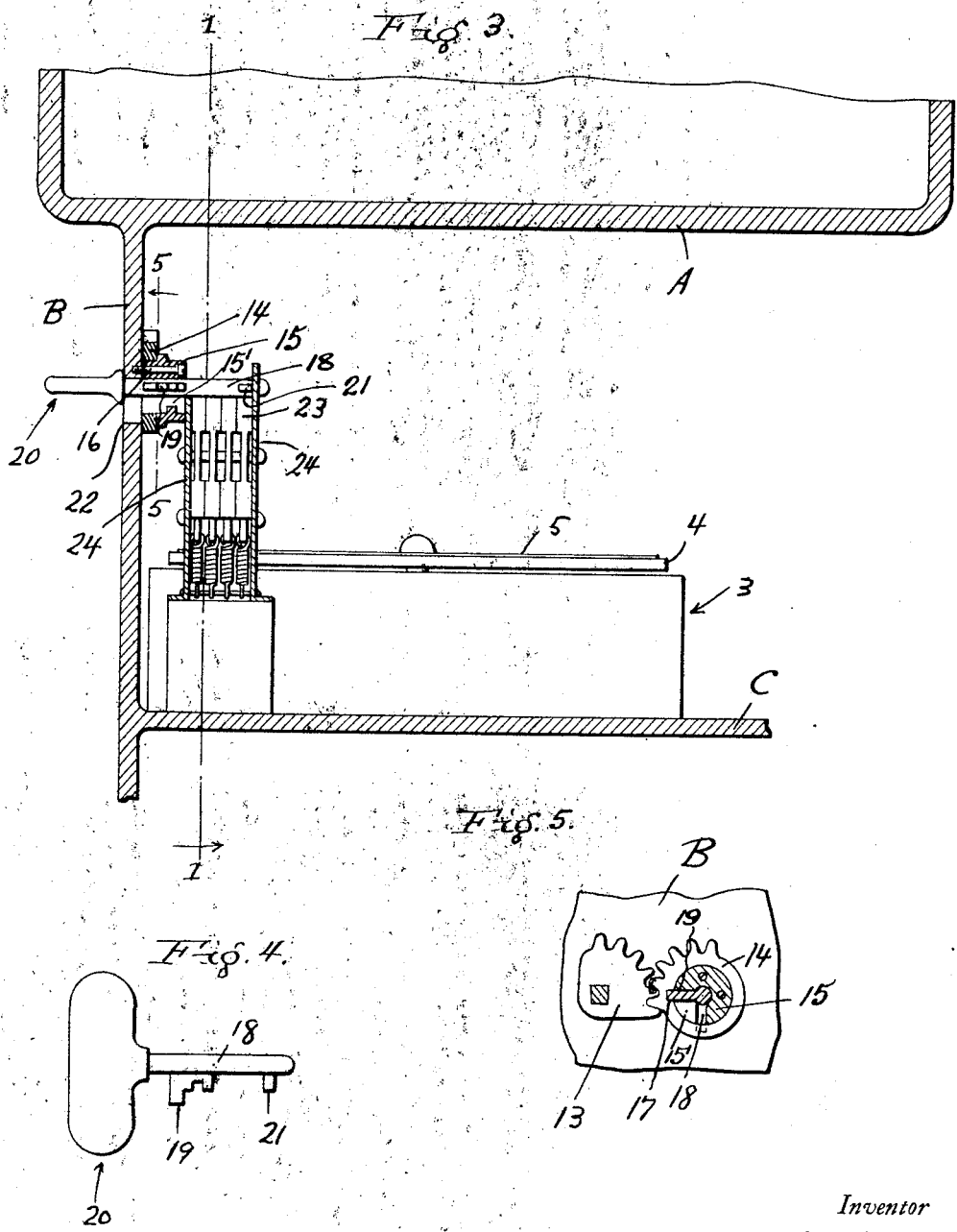

Patented Mar. 24, 1931

1,797,665

UNITED STATES PATENT OFFICE

GEORGE FRANK MacKENZIE, OF GLACE BAY, NOVA SCOTIA, CANADA, ASSIGNOR OF ONE-FIFTH TO WARREN BAIRD, OF GLACE BAY, NOVA SCOTIA, CANADA; ONE-TENTH TO HERBERT A. MORTON, OF NORTH SYDNEY, NOVA SCOTIA, CANADA; AND ONE-TENTH TO JAMES G. HACKETT, OF NORTH SYDNEY, NOVA SCOTIA, CANADA

RECORDER

Application filed March 5, 1929. Serial No. 344,492.

The present invention appertains to new and useful improvements in recorders and more particularly to a recorder especially adapted for use on gasoline pumps such as are employed at filling stations.

The principal object of the invention is to provide a recorder which will record the amount of liquid ready to be dispensed and the key character of the persons dispensing the liquid, simultaneously with the discharging of the liquid from the container.

Another important object of the invention is to provide a recorder which will indicate the time at which the liquid was dispensed from the container.

Still another object of importance resides in the provision of a recorder whereby an identification mark, corresponding to the individual dispensing the liquid will be made on a chart simultaneously with the releasing of the liquid volume by the said individual.

These and other objects of the invention will become more apparent to the reader after considering the invention as described and claimed hereinafter.

In the drawings:

Figure 3 is a fragmentary vertical sectional view through the invention taken substantially at right angles to the view shown in Figure 1.

Figure 4 is a side elevation of the individual key, whereby the mechanism may be operated.

Figure 5 is a fragmentary vertical sectional view of the means for operating the discharge valve through the actuation of the key member shown in Figure 4.

Figure 1:
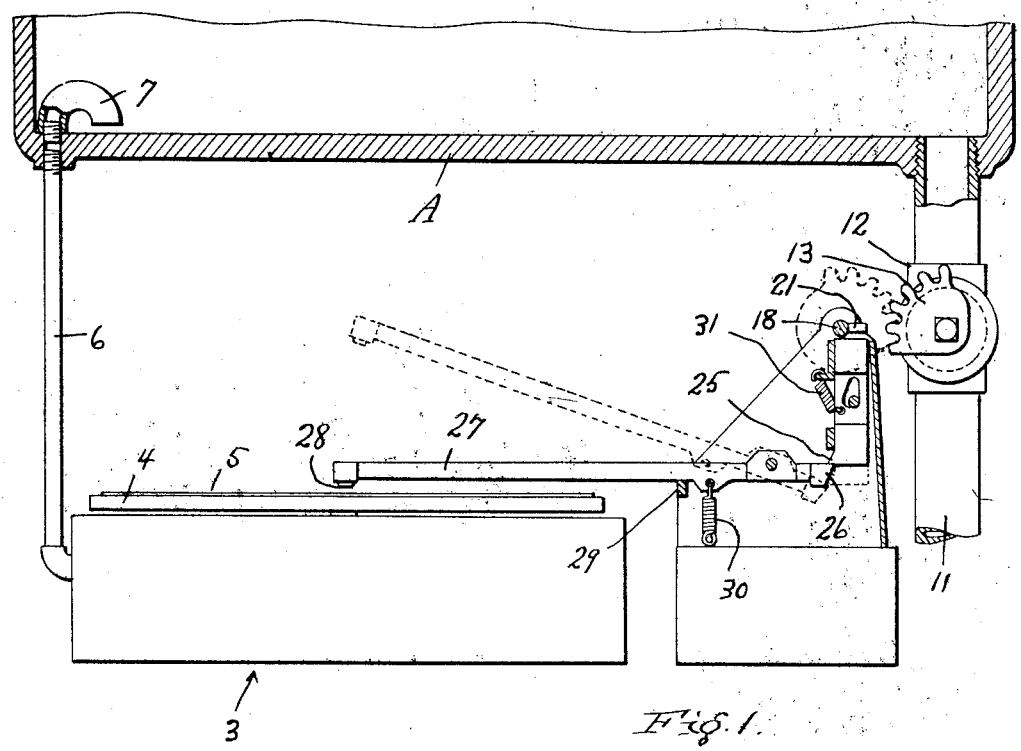
Figure 1 represents a fragmentary vertical sectional view through a portion of the present invention.
Figure 2:
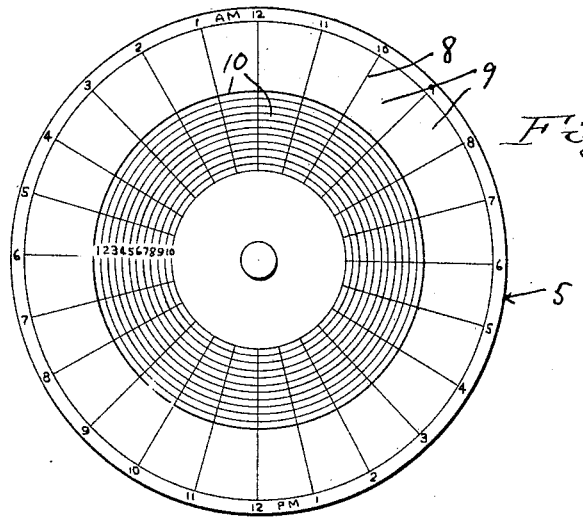
Figure 2 is a top plan view of the recording chart used in conjunction with the present invention.

Referring to the drawings, wherein like numerals designate like parts, the invention is to be associated with various types of dispensing pumps, particularly those employing the elevated container shown in the drawings and designated by A. Optionally a wall B is shown for supporting the container A and has a shelf C extending horizontally therefrom in the manner shown in Figure 3. Upon the shelf B is mounted the time controlled recording mechanism 3, which is provided with a turn table 4, upon which a chart 5 is superimposed. A pipe 6 leads from the container A to the mechanism 3, so that the volume of liquid in the container A may be recorded. The upper end of the pipe 6 communicates with a goose neck 7, whereby sediment in the container A will be prevented from precipitation in the pipe 6.

The chart 5 has a plurality of radially extending lines 8 marked thereon to provide preferably twenty-four spaced notches, representing the twenty-four hours of a complete day. Within the spaces 9, the identification marks on the operators of the dispenser are to be stamped. A plurality of circles (preferably ten) 10 are mounted on the chart 5 in concentric spaced relation and between these circles and within the lines 8 is to be marked the quantity of liquid in the container A from time to time.

The container A is provided with a discharge pipe 11 having a valve 12 interposed therein. The valve stem extends exteriorly of the pipe 11 and is equipped with a quadrant gear 13, for mesh with the quadrant gear 14, journaled on the hub striker 15. The hub striker 15 is secured to the wall B by a suitable element 16. A key slot 17 is provided in the gear 14, while the hub 15 is provided with a pocket 15' to receive the stem 18 and ward 19 of a key generally referred to by numeral 20. The key 20 is only one of a group of keys, one of which is to be tendered to each of the operators at a filling station. Each key is characteristically different from the other keys in the particular disposition of the outermost ward 21 and the stem 18. As is shown in Figure 3, the wall B is formed with a key opening 22 through which the key is inserted so that the ward 19 may engage within the pocket 15' of the hub 15 and the key slot 17 of the gear 14.

By rotating the key the ward 19 will swing the quadrant gear 14, and this gear being in mesh with the gear 13 will cause the opening of the valve 12. Simultaneously with the opening of the valve 12, the ward 21 will have engaged one of the slide bars 23, arranged between the guide plates 24—24. Each of the slide bars 23 is provided at its lower end with a laterally disposed and bevelled formation 25, for engagement with the bevelled head 26 of an elongated rocker arm 27. Sufficient play is provided at the front and rear edges of the slide bars to allow the bevelled edge 25 to ride past the bevelled edge 26 whereby to free the rocker arm after being raised a predetermined distance. Each of the rocker arms 27 is provided at its outer end with a suitable stamp 28. A bar 29 bridges the guide plates 24—24 and upon this bar the rocker arms 27 are adapted to normally rest in the position shown in Figure 1. The portion of the arm 27 outwardly from the pivot point thereof is suitably springy so that when the arm is rapidly drawn downwardly from the dotted line position in Figure 1, by the action of the coiled spring 30 the same will flex sufficiently to impress the identification mark corresponding to the key inserted. A coiled spring 31 is engaged with each of the slide bars 23, for normally maintaining the same in the elevated position shown in Figure 1.

It will thus be seen that the present invention provides a novel mechanism whereby various items of importance may be accurately checked without the human element being involved. Furthermore, it is to be understood that certain changes in the specific shape, size and materials may be resorted to, in the construction of this novel mechanism without departing from the spirit and scope of the invention as claimed hereinafter.

Having described my invention, what I claim as new is:

1. In a recorder for a material dispenser, a time controlled chart carrier, a chart on said carrier, a vertically disposed manually operable slide bar loosely mounted between a pair of guides, spring means normally holding the slide bar in a raised position, a striking key bar rockably mounted intermediate its ends and having one end arranged over the chart and the other end in the path of the slide bar, said key bar being releasably engaged by the slide bar for movement into striking position by the latter upon initial movement thereof and released from the slide bar upon a predetermined movement thereof and spring means for returning one end of the key bar into engaged position with the slide bar and urging the opposite end toward the chart.

2. In a recorder for a material dispenser, a time-controlled chart carrier, a chart on said carrier, a vertically disposed manually operable slide bar loosely mounted between a pair of guides, a striking key bar rockably mounted intermediate its ends and having one end arranged over the chart and the other end in the path of the slide bar, and spring means normally urging the key bar toward the slide bar and its opposite end toward the chart, the terminal of said key bar below the slide bar being bevelled, and said slide bar having a bevelled tooth overlapping the bevelled edge of the key bar, and releasable therefrom following the initial downward movement of the slide bar and spring means normally urging the slide bar in raised position above the key bar.

In testimony whereof I affix my signature.

GEORGE FRANK MacKENZIE.